United States Patent
Williams et al.

(10) Patent No.: US 7,195,281 B2
(45) Date of Patent: Mar. 27, 2007

(54) EXPANSION-CONTROLLED JOINTS IN AIRBAGS FOR OUT-OF-POSITION OCCUPANTS AND CUSHION POSITIONING

(75) Inventors: Jeffrey Daniel Williams, Roy, UT (US); Patrick D. Jamison, North Ogden, UT (US); James Clyde Coleman, North Ogden, UT (US); James D. Erickson, West Haven, UT (US)

(73) Assignee: Autoliv ASP, Inc., Ogden, UT (US)

( * ) Notice: Subject to any disclaimer, the term of this patent is extended or adjusted under 35 U.S.C. 154(b) by 313 days.

(21) Appl. No.: 10/733,846

(22) Filed: Dec. 11, 2003

(65) Prior Publication Data

US 2005/0127653 A1 Jun. 16, 2005

(51) Int. Cl.
*B60R 21/16* (2006.01)
(52) U.S. Cl. .................. 280/743.2; 280/730.1
(58) Field of Classification Search .......... 280/730.1, 280/743.1, 743.2, 734, 732
See application file for complete search history.

(56) References Cited

U.S. PATENT DOCUMENTS

| | | | |
|---|---|---|---|
| 3,879,056 A | 4/1975 | Kawashima et al. | |
| 4,966,389 A | 10/1990 | Takada | |
| 5,308,113 A | 5/1994 | Moriset | |
| 5,489,119 A | 2/1996 | Prescaro et al. | |
| 5,513,877 A * | 5/1996 | MacBrien et al. | 280/732 |
| 5,813,696 A * | 9/1998 | Hill | 280/743.2 |
| 5,887,894 A | 3/1999 | Castagner et al. | |
| 5,997,037 A | 12/1999 | Hill et al. | |
| 6,315,323 B1 * | 11/2001 | Pack, Jr. | 280/743.2 |
| 6,334,627 B1 * | 1/2002 | Heym et al. | 280/743.2 |
| 6,390,501 B1 * | 5/2002 | Greib et al. | 280/743.2 |
| 6,422,597 B1 * | 7/2002 | Pinsenschaum et al. | 280/735 |
| 6,425,603 B1 | 7/2002 | Eschbach | |
| 2002/0175511 A1 | 11/2002 | Dunkle et al. | |
| 2003/0030254 A1 | 2/2003 | Hasebe | |
| 2004/0256841 A1 * | 12/2004 | Bakhsh et al. | 280/743.2 |

FOREIGN PATENT DOCUMENTS

| | | |
|---|---|---|
| EP | 0 586 131 A1 | 3/1994 |
| WO | WO-01/34436 A1 | 5/2001 |

* cited by examiner

*Primary Examiner*—Ruth Ilan
*Assistant Examiner*—Tiffany L. Webb
(74) *Attorney, Agent, or Firm*—Sally J Brown; Madson & Austin (57) ABSTRACT

The application provides airbag cushion deployment restraint systems for use in inflatable airbag cushions. The deployment restraint systems of the invention regulate deployment of an airbag cushion to provide full radial expansion of the cushion prior to final expansion of the cushion toward a vehicle occupant. The deployment restraint systems of the invention thus increase the amount of contact surface area available to a vehicle occupant early in deployment and decrease the force with which the cushion is expanded toward a vehicle occupant during a collision event, thus reducing the likelihood of injury to an out-of-position vehicle occupant.

22 Claims, 8 Drawing Sheets

EXPANSION-CONTROLLED JOINTS IN AIRBAGS FOR OUT-OF-POSITION OCCUPANTS AND CUSHION POSITIONING

BACKGROUND OF THE INVENTION

1. Field of the Invention

The present invention relates to apparatus for regulating the deployment characteristics of an airbag cushion. More specifically, the present invention relates to apparatus and methods of their use for temporarily restraining the longitudinal expansion of a deploying airbag cushion to allow the cushion to achieve its fullest transverse width prior to expanding toward a vehicle occupant such as an out-of-position occupant.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational airbag module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies currently known in the art to produce a volume of an inflation gas. The inflation gas is channeled into the airbag, inflating it. Inflation of the airbag causes it to deploy, placing it in a position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

As experience in the manufacture and use of airbags has increased, the engineering challenges involved in their design, construction, and use have become better understood. Most airbag systems are designed to rapidly inflate and provide a cushion in proximity to a vehicle occupant. Many such cushions are configured to be placed in front of a vehicle occupant. Placement of the cushions is determined based on presumptions made of the position occupied by a vehicle occupant in a vehicle during normal operation of the vehicle. Thus, a vehicle occupant enjoys optimal protection from a specific airbag when the occupant is in the presumed range of positions when the airbag deploys.

In some situations, injuries have been noted to occur when a vehicle occupant is "out of position" with regard to the presumed position discussed above. Some such injuries have been attributed to incidents in which vehicle occupants located out-of-position during the deployment of an airbag cushion are located in the path of the inflating cushion. Currently available airbag systems rapidly inflate a cushion in front of an occupant during a collision. This inflation process is generally difficult to regulate, however, and some regions of the cushion may inflate before others, increasing the risk of injury to out-of-position occupants located near these early-filling portions of the cushion.

Potential injury to out-of-position occupants could be reduced and/or avoided by the use of systems capable of causing full radial expansion of an airbag cushion prior to placement of the cushion in front of the vehicle occupant. Similarly, injury could be reduced by the use of systems capable of reducing the forward momentum with which an airbag cushion is directed toward a vehicle occupant. Some systems currently available to regulate cushion expansion and deployment often utilize passive tether systems such as "break-tethers"—tethers configured to first hold an airbag cushion at a specified state and then to rupture at a specified load to release the cushion and allow full cushion deployment. Although useful, such systems have proven complex, with a large number of variables present in configuring a break tether for a specific application, and a large number of variables which may affect the performance of the tethers. Other technologies utilize active tether systems which have several characteristics which may be actively controlled by systems of the vehicle. These technologies are also very complex and more expensive to implement and use in a vehicle.

Accordingly, a need exists for airbag deployment restraint devices for use in vehicles to regulate the deployment characteristics of an airbag cushion such that out-of-position vehicle occupants receive a more even load during inflation of the airbag cushion. It would be specifically beneficial to provide an airbag deployment restraint device capable of forcing the deploying airbag cushion to assume its fullest radial width prior to fully expanding toward a vehicle occupant, thus presenting a broad surface area for potential contact with the vehicle occupant. There is a similar need for devices capable of regulating the momentum with which an airbag cushion expands toward a vehicle occupant. It would be a further advantage in the art to provide such an airbag deployment restraint device that is compatible with existing airbag cushion and housing designs to avoid the costs associated with the customization of existing airbag modules. Such airbag cushion deployment restraint devices and methods for their use are provided herein.

SUMMARY OF THE INVENTION

The apparatus and method of the present invention have been developed in response to the present state of the art, and in particular, in response to the problems and needs in the art that have not yet been fully solved by currently available airbag cushion deployment restraint systems, including internal tether systems such as internal break-tether systems. Thus, the present invention provides novel deployment restraint systems having expansion-controlled joints and airbag cushions incorporating such systems used to reduce the probability of injury to an out-of-position vehicle occupant during the deployment of an airbag cushion.

In one embodiment, the invention provides an inflatable airbag cushion including a contact panel adapted to receive a vehicle occupant during a collision event, a reaction panel adapted to abut a surface of a vehicle, and a deployment restraint system having an expansion-controlled joint attached between the contact and reaction panels. According to the invention, the deployment restraint system is configured to restrict the initial expansion of the airbag cushion toward a vehicle occupant.

In use, the deployment restraint system generally limits the initial thickness of the cushion to allow the cushion to expand in directions not directly toward the vehicle occupant. This provides an initial inflation state in which the cushion has not attained its full depth, but is inflated to its full radial shape to present the most surface area possible to a vehicle occupant. The expansion-controlled joint of the deployment restraint system then releases, providing a final inflation state in which the cushion's depth is increased to the full depth and the cushion is placed in front of the vehicle occupant. The deployment restraint systems of the invention generally provide these inflation states by including features that interlink the contact and reaction panels of the airbag cushion. These interlinking structures are specifically suited to withstanding the initial inflation shear forces that tend to expand the depth of the airbag cushion. According to the invention, however, these interlinking features are releasably joined with an expansion-controlled joint such that a force exerted in or from a second direction may disrupt the joint, freeing the cushion to expand to its full width. In many of the embodiments of the invention, the disruptive force exerts a peeling force on the interlinked features, allowing them to be separated by a comparatively small force.

The expansion-controlled joint of the deployment restraint systems of the invention may take various forms within the scope of the invention. In one embodiment, the deployment restraint system may include first and second tethers extending from the contact and reaction panels, respectively, which are interlinked at a releasable joint, which is also interlinked with an expansion trigger. The releasable joint of the deployment restraint system may be formed using a variety of means currently known in the art which provide a joint which is strong and stable under shear forces, but which may be disrupted with a force from a different direction such as a force which places the releasable joint in a peel condition. More specifically, the joint has sufficient strength when initially loaded with a primarily shearing force to maintain the attachment of the first and second tethers and to initially limit the expansion of the inflatable restraint in the direction of the vehicle occupant. Then, after more complete radial expansion of the airbag cushion, the releasable joint releases one of the tether segments as a result of the application of a second force, often a peeling force applied to the releasable joint produced by the movement of the expansion trigger's attachment to the inflatable cushion away from the releasable joint.

An expansion trigger that may take the form of a tether within the scope of the invention generally applies this force. This expansion trigger is generally attached to one of the tethers in a secure fashion such that forces applied to the trigger are transferred to the associated tether, thus placing the releasable joint in peel, or otherwise triggering release of the joint.

Some suitable releasable joints according to the invention may be produced by using adhesive compounds to attach the first and second tethers to each other, and additionally, to attach the expansion trigger to the releasable joint. Other suitable joints may be created by providing a hook-and-loop fastener at the joint of the first and second tethers. Yet another may be provided by securing the first and second tethers to each other using a releasable stitching method such as a chain stitch which may be released by a force applied to the seam by an expansion trigger tether. Similarly, a frangible stitching method or material may be used such that a peel force applied to the releasable joint disrupts the stitching, releasing the tethers. Use of heat-sensitive tether materials may allow the use of a heat weld or a friction weld to releasably join the tethers together. In addition, a wide variety of mechanical fasteners may be used in the releasable joints of the invention that are strong when subjected to a shear force but weak when subjected to a peel force. Examples of suitable mechanical fasteners include rivets, snaps, and bolts, as well as other such mechanical fasteners which are strong in shear, but weak in peel. Such mechanical fasteners could be produced from metal or plastic. Such fasteners could be placed through tethers of the apparatus of the invention in series such that the application of a peel force disrupts the fasteners.

As briefly discussed above, the release trigger attached to the releasable joint of the deployment restraint systems of the invention may be a third tether extending from the releasable joint and attached to a more peripheral section of a panel of the airbag cushion. Such a third tether of the release trigger may be a separate tether linked to either the first or second tether of the deployment restraint system, or it may simply be an extended portion of the first or second tether of the deployment restraint system continuing past the releasable joint and then being attached to the cushion at another point. In some embodiments of the deployment restraint systems of the invention, the release trigger is attached to the releasable joint and then to the contact and reaction panels at a seam between the contact and reaction panels.

In an alternate embodiment of the deployment restraint systems of the invention, the releasable joint may be formed using two interlinking mechanical structures in place of tethers. This could include loop-shaped links extending from the contact and reaction panels of an airbag cushion with a release trigger in the form of an elongate mechanical release trigger such as a joining rod, pin, or tether extending from a more peripheral region of the airbag cushion. When folded, the release trigger would extend through both of the links, effectively coupling them. As the airbag cushion expands, the release trigger would withdraw, releasing the links and freeing the airbag cushion to expand its depth. A similar embodiment of the invention may use looped tethers extending from the contact and reaction panels that interlink about a rod-shaped expansion trigger.

In yet other embodiments of the deployment restraint systems of the invention, the deployment restraint system may include a single expansion tether attached between the contact and reaction panels of the airbag cushion. In this embodiment, the expansion tether is joined to one of the panels of the airbag cushion with a releasable joint. Typically, this joint is made with the reaction panel of the cushion. As the airbag cushion expands, inflation of the airbag cushion toward a vehicle occupant in a first direction of expansion extends the expansion tether to the limiting point, and then as expansion of the airbag cushion in a second direction at an angle to the first direction of expansion, the panel of the cushion linked to the expansion tether acts as a release trigger by peeling away, thus releasing the releasable joint. The second direction of expansion may occur at an angle to the initial direction of deployment, in some cases being nearly perpendicular to the initial direction of deployment. This second direction of expansion may thus be primarily upward or downward in a transverse direction.

As in the previous embodiments of the expansion-controlled joint of the deployment restraint systems of the invention the releasable joint may be formed using adhesives, hook-and-loop fasteners, releasable stitching, frangible stitching, heat welds, or friction welds. Further, the deployment restraint systems of the invention are suitable for use in a wide variety of airbag cushions, including, but not limited to, steering wheel-mounted driver's side airbag cushions, dashboard-mounted passenger's side airbag cushions; overhead airbag cushions; inflatable curtain airbag cushions; pillar-mounted airbag cushions; and knee bolsters.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus and system of the present invention, as represented in FIGS. 1 through 6C, is not intended to limit the scope of the invention, as claimed, but is merely representative of presently preferred embodiments of the invention.

Increased consumer and regulator awareness are driving development in the field of passive restraint devices as a whole, and specifically in the field of vehicular airbags. One issue given particular attention in recent times is the issues posed by out-of-position occupants. The issues posed by the myriad of potential positions potentially occupied by occupants of a vehicle have been difficult to resolve. As noted above, it would be a distinct advance in the art to provide apparatus that allows a vehicular airbag to expand to substantially its full transverse and lateral dimensions before allowing the cushion to expand to reach its full longitudinal dimensions. Such a device could allow proper placement of the cushion relative to the occupant prior to contact. In addition, such a device could allow the amount of momentum directed toward the vehicle occupant to be decreased. Deployment restraint devices with expansion-controlled joints, airbag cushions incorporating such a restraint devices, and methods for their use are provided herein.

Figure 1:
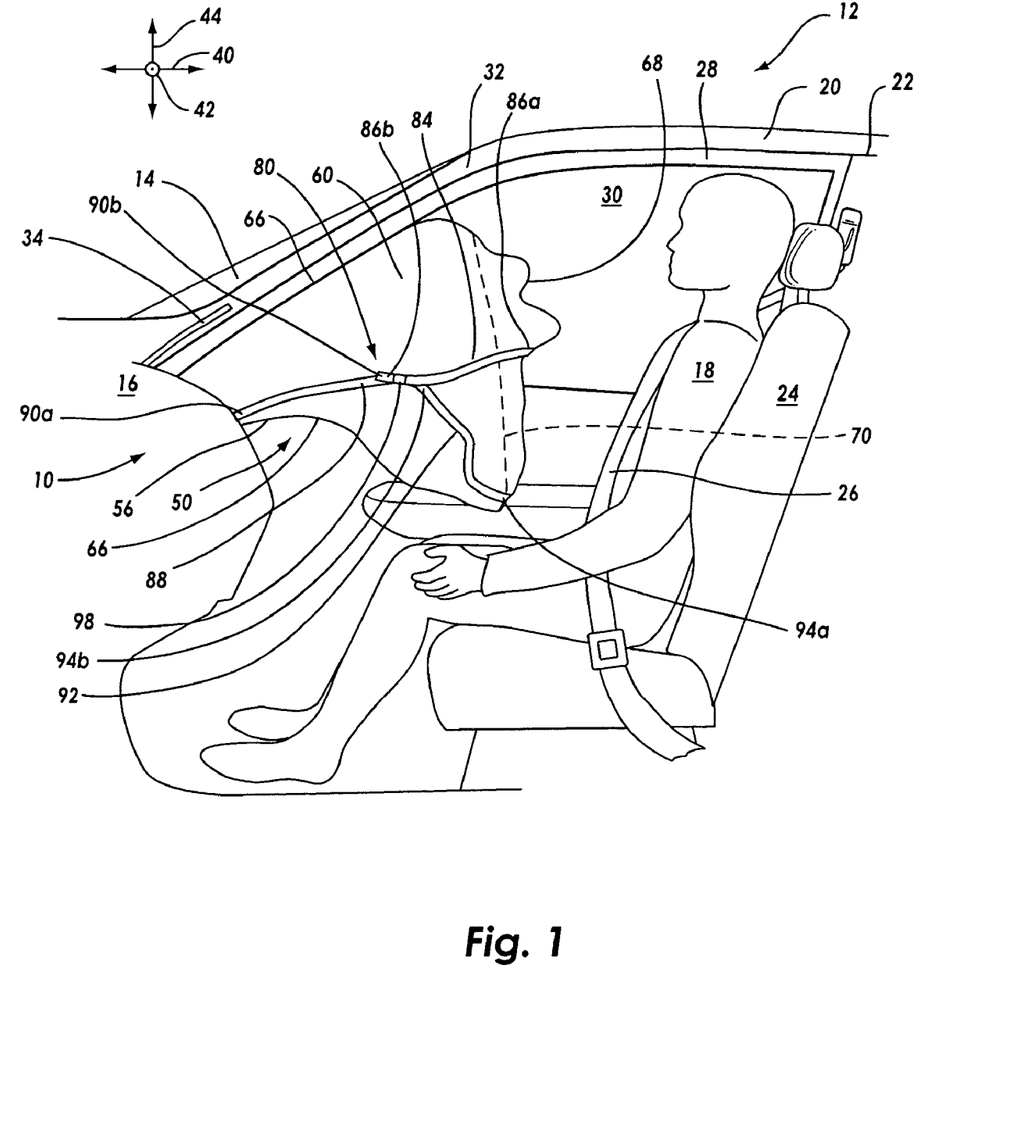
FIG. 1 is an isolated perspective view of the interior of a vehicle including a cutaway view of an airbag cushion incorporating a limiting tether system according to the invention initially inflated in a longitudinal direction.

FIG. 1 provides an isolated perspective view of the interior of a vehicle 12 including a cutaway view of an airbag cushion 50 incorporating a deployment restraint system 80 according to the invention. The vehicle 12 generally includes a windshield 14 and dashboard 16 positioned forward of a vehicle occupant 18 in a longitudinal direction 40. A seat 24 is provided behind the dashboard 16 for the vehicle occupant 18, who may be retained to the seat 24 by a seatbelt 26. The occupant 18 is bounded in a lateral direction 42 by a vehicle door 28, side window 30, and roof 20. The door 28 supports the side window 30 and is bounded in part by a vehicle A-pillar 32 and roof trim 22 of the vehicle 12.

The vehicle 12 is shown to include an airbag module 10 housed in the dashboard 16 behind a compartment door 34. The airbag module 10 is configured to place an airbag cushion 50 in front of the vehicle occupant 18 during a collision event to protect the occupant 18 from injury. The airbag cushion 50 of FIG. 1 is illustrated in a partially-inflated configuration. In this configuration, the airbag cushion is shown to have exited the dashboard 16, displacing the compartment cover 34, and to have begun to expand in a longitudinal direction 40 toward the vehicle occupant 18. The airbag cushion 50 includes a cushion throat 56 which attaches the cushion 50 to the vehicle 12 and to an inflator (not shown). The cushion further includes a cushion body 60 made up of a reaction panel 66 and a contact panel 68. The reaction panel 66 is designed for placement in abutment to surfaces of the vehicle including the windshield 14 and dashboard 16. In airbag cushions placed in different areas in a vehicle, the reaction panel could abut the door of a vehicle, the steering wheel of a vehicle, as well as other vehicle surfaces. As illustrated in FIG. 1, the reaction panel 66 is a cone-shaped structure extending from the dashboard 16 of the vehicle outward to join the contact panel 68. The contact panel 68 is designed for placement before the vehicle occupant 18 in a longitudinal direction 40 when the cushion 50 is deployed. It should be noted that as used in this application, the term "panel" describes a portion of the airbag cushion not necessarily corresponding to a physical segment of material assembled with others to form the cushion 50.

In FIG. 1, the forward expansion of the airbag cushion 50 is shown to be restricted by a deployment restraint system 80 present in the interior of the cushion 50. The deployment restraint system 80 is generally provided in the interior of the airbag cushion 50. In this embodiment, the deployment restraint system 80 is illustrated to include a contact tether 84 and a reaction tether 88. The contact tether 84 has a first end 86*a* attached to the contact panel 68 of the cushion 50, and a second end 86*b* linked to the reaction tether 88 at a releasable joint 98. The reaction tether 88 has a first end 90*a* attached to the reaction panel 66 of the cushion 50 and a second end 90*b* linked to the contact tether 84 at a releasable joint 98. The deployment restraint system 80 further includes a release trigger 92 having a first end 94*a* attached to the airbag cushion 50 and a second end attached to the releasable joint 98. The first end 94*a* of the release trigger 92 may be attached to either the reaction panel 66 or the contact panel 68 of the airbag cushion 50. Alternately, the first end 94*a* of the release trigger 92 may be attached between the contact and reaction panels 68, 66 at a seam 70 (shown in phantom).

At the stage of airbag cushion 50 deployment illustrated in FIG. 1, the contact panel 68 of the cushion 50 has traveled from the dashboard 16 toward the occupant 18 in a longitudinal direction. This longitudinal expansion is limited by the length of the combined reaction and contact tethers 84, 88. These tethers 84, 88 are joined by the releasable joint 98. This joint 98 may take many forms. In the embodiments of the invention, the releasable joint 98 is configured to be very strong in tension such that the rapid forward expansion of the cushion 50 is incapable of disrupting the joint 98. At the same time, the joint 98 is vulnerable to disruption by a force from a different direction. Suitable releasable joints 98 may be created using adhesives; affixing hook-and-loop fasteners to the contact and reaction tethers 84, 88; linking the tethers 84, 88 using a releasable stitching such as a chain stitch; linking the tethers 84, 88 with stitching using a thread that is easily broken by the release trigger 92; heat-welding the tethers 84, 88; friction-welding the tethers 84, 88; and linking the tethers 84, 88 with mechanical fasteners.

Within the scope of the invention, mechanical fasteners could include a wide variety of fasteners which are stable when subjected to a shear force but weak when subjected to a peel force. Examples of suitable mechanical fasteners include rivets, snaps, and bolts, and other similar mechanical fasteners known to one of skill in the art which are strong in shear, but weak in peel. Such mechanical fasteners could be produced from metal or plastic. In use, these fasteners could be placed through tethers of the apparatus of the invention in series such that the application of a peel force disrupts the fasteners. Still further, interlocking features such as snaps, rivets, or recloseable interlocking seals could be produced on plates mountable on the ends of the tethers which could then be locked together for use in an airbag cushion.

In some embodiments of the releasable joint 98 of the invention there may be a large differential in the amount of force the releasable joint 98 will bear in shear versus the amount of force the releasable joint 98 will bear in peel. In some embodiments of the invention, the shear/peel ratio may be more than 100:1. In still others, the shear/peel ratio may be less than 100:1. In some specific (separate) embodiments, the shear/peel ratio may be about 100:1, 80:1, and 20:1. In alternate embodiments of the releasable joint of he invention such as those using a removable physical interlink, the force needed to withdraw the interlink and release the cushion panels may be infinitely small, producing very high shear/release force ratios.

In some of the releasable joints 98 of the invention it is desirable to have a predictable shear/peel force ratio for the releasable joint 98. In many joints such as those constructed using an adhesive, it has been discovered that the shear/peel ratio may be controlled by the shape and size of the joint 98 produced. In one example, the properties of a releasable joints 98 produced with an adhesive compound may be controlled by the amount and arrangement of the adhesive used to form the releasable joint 98. It has been found in adhesive-produced releasable joints 98 that the area of the joint is important to the amount of shear force that may be borne by the joint. In contrast, it has been discovered that the width of the adhesive used determines the amount of peel force needed to separate the joined tethers. One joint configuration found to be useful uses narrow strips of adhesive placed parallel with the direction of the shear force. The number and width of the strips may be modulated to provide adequate joint area to support the needed amount of shear force while providing a sufficiently small adhesive width to allow successful peeling of the joint 98 to release it. One particular joint used in embodiments of the invention includes three strips of adhesive whose length may be varied to increase the adhesive area, and whose width may be varied to regulate the amount of peel force needed to disrupt the joint 98.

Figure 2:
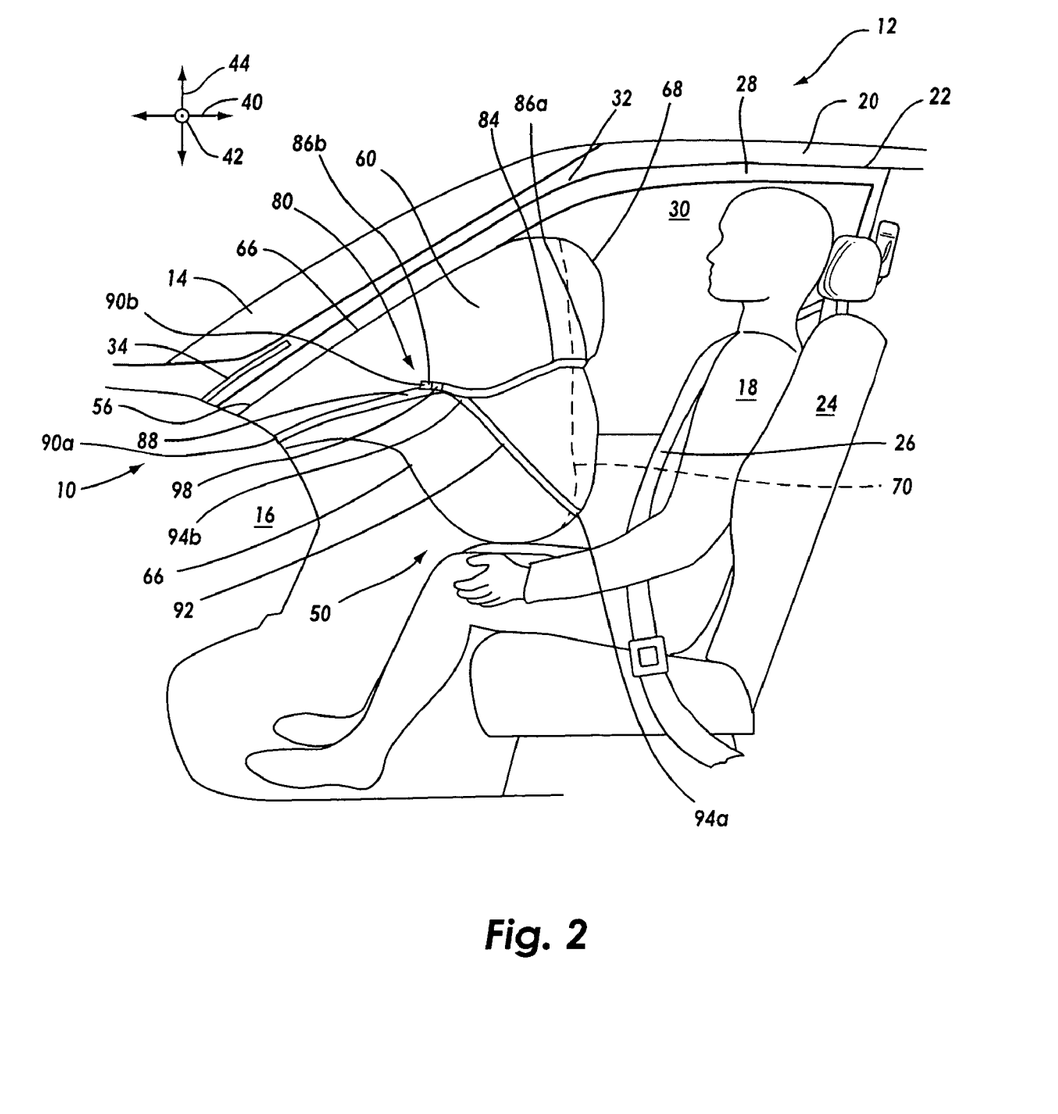
FIG. 2 is an isolated perspective view of the interior of the vehicle of FIG. 1 showing the airbag cushion and limiting tether system inflated such that the airbag cushion has expanded in a transverse direction.

Referring next to FIG. 2, the vehicle illustrated in FIG. 1 is shown with the airbag cushion 50 more fully expanded with the contact and reaction tethers 84, 88 drawn taught, and with the cushion 50 being more fully extended in a transverse direction 44. In this manner, FIG. 2 illustrates an initial effect of the deployment restraint system 80 of FIG. 1—the cushion 50 has expanded to a predetermined size in the longitudinal direction 40 defined by the sum of the lengths of the linked contact and reaction tethers 84, 88. The expansion of the cushion 50 is then restricted in that direction since, as briefly discussed above, the joint 98 is strong in tension.

This restriction of inflation in the generally longitudinal direction 40 forces the inflation gases entering the cushion throat 56 to be directed in a more transverse direction 44, causing the cushion 50 to fill upward along the windshield 14 and downward. This may diffuse the initial momentum of the airbag cushion 50 directed toward the vehicle occupant 18, while expanding the cushion to its full lateral and transverse dimensions. Following this state, the deployment restraint system 80 may be released and the cushion 50 may inflate to its complete longitudinal size, as illustrated in FIGS. 3 and 4.

In the embodiment of the deployment restraint system 80 illustrated in FIGS. 1–4, this inflation is responsible for actuating the release trigger 92. Specifically, as the cushion 50 expands in a transverse direction 44, it draws the tether of the release trigger 92 taut, placing a "peel" force on the releasable joint 98. In this embodiment, this peel force is exerted at an angle to the releasable joint 98. This peel force generally acts to separate the contact tether 84 from the reaction tether 88, thus freeing the cushion 50 to complete its longitudinal expansion. In FIG. 2, the releasable joint 98 is shown to have begun to separate as the release trigger 92 peels the reaction tether 88 away from the contact tether 84.

Figure 3:
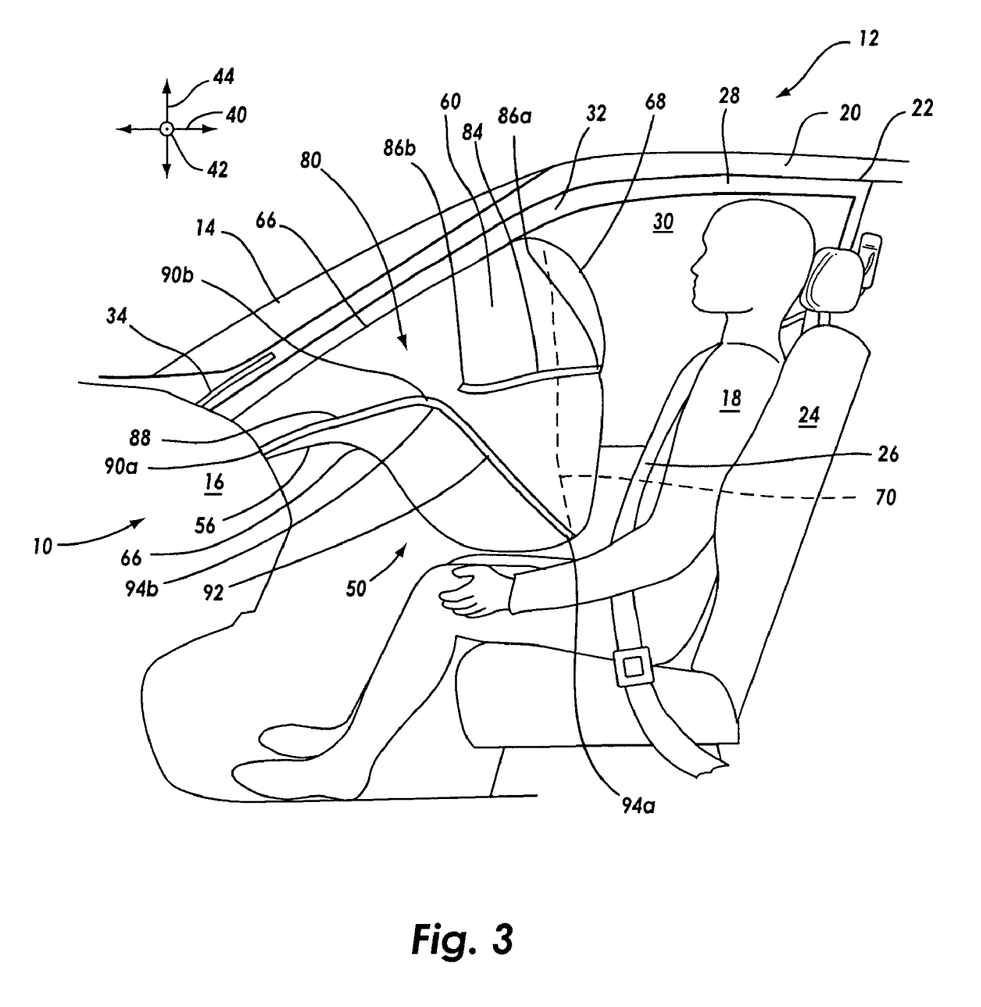
FIG. 3 is an isolated perspective view of the interior of the vehicle of FIG. 1 showing the airbag cushion and limiting tether system following release of the limiting tether system of the invention.
Figure 4:
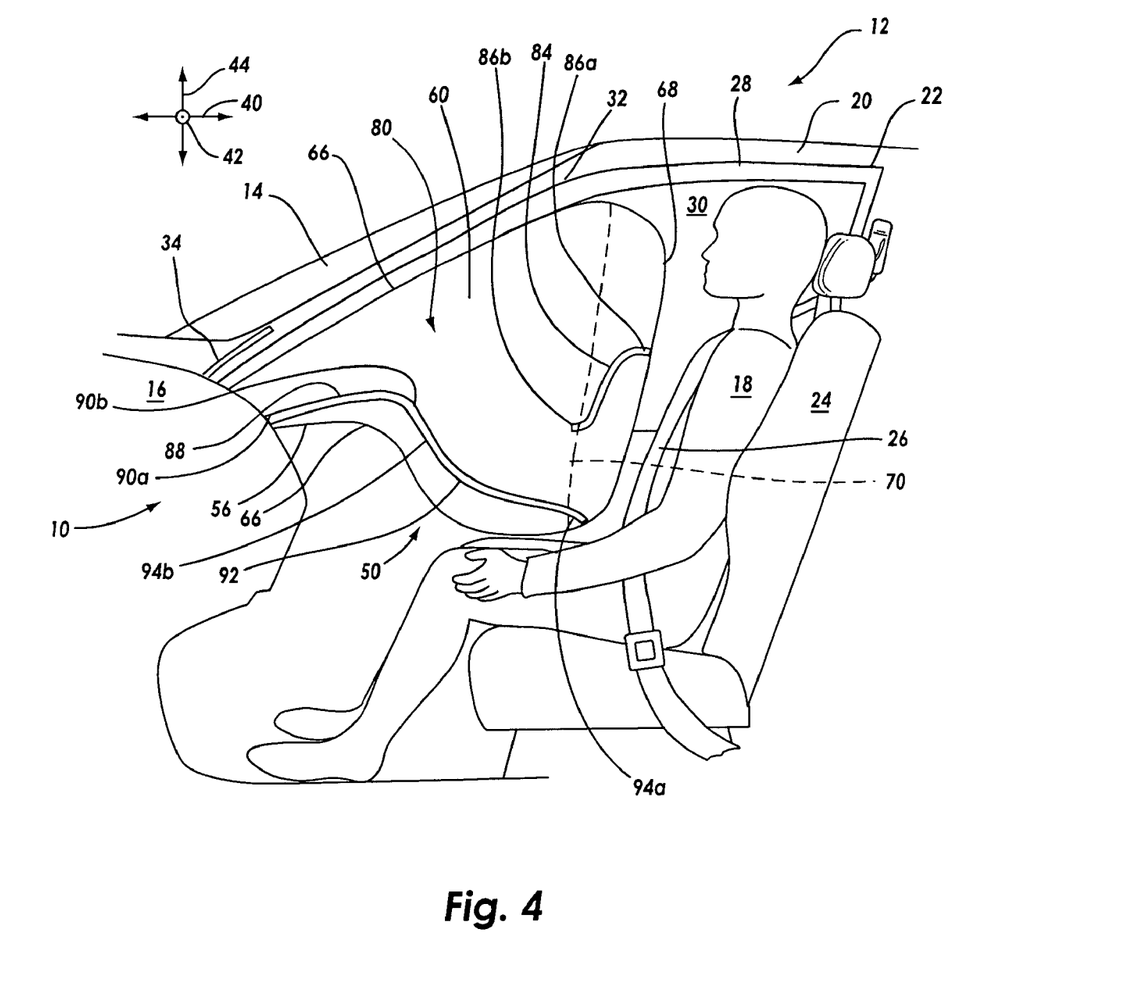
FIG. 4 is an isolated perspective view of the interior of the vehicle of FIG. 1 showing the airbag cushion fully inflated following release of the limiting tether system of the invention.
Figure 5:
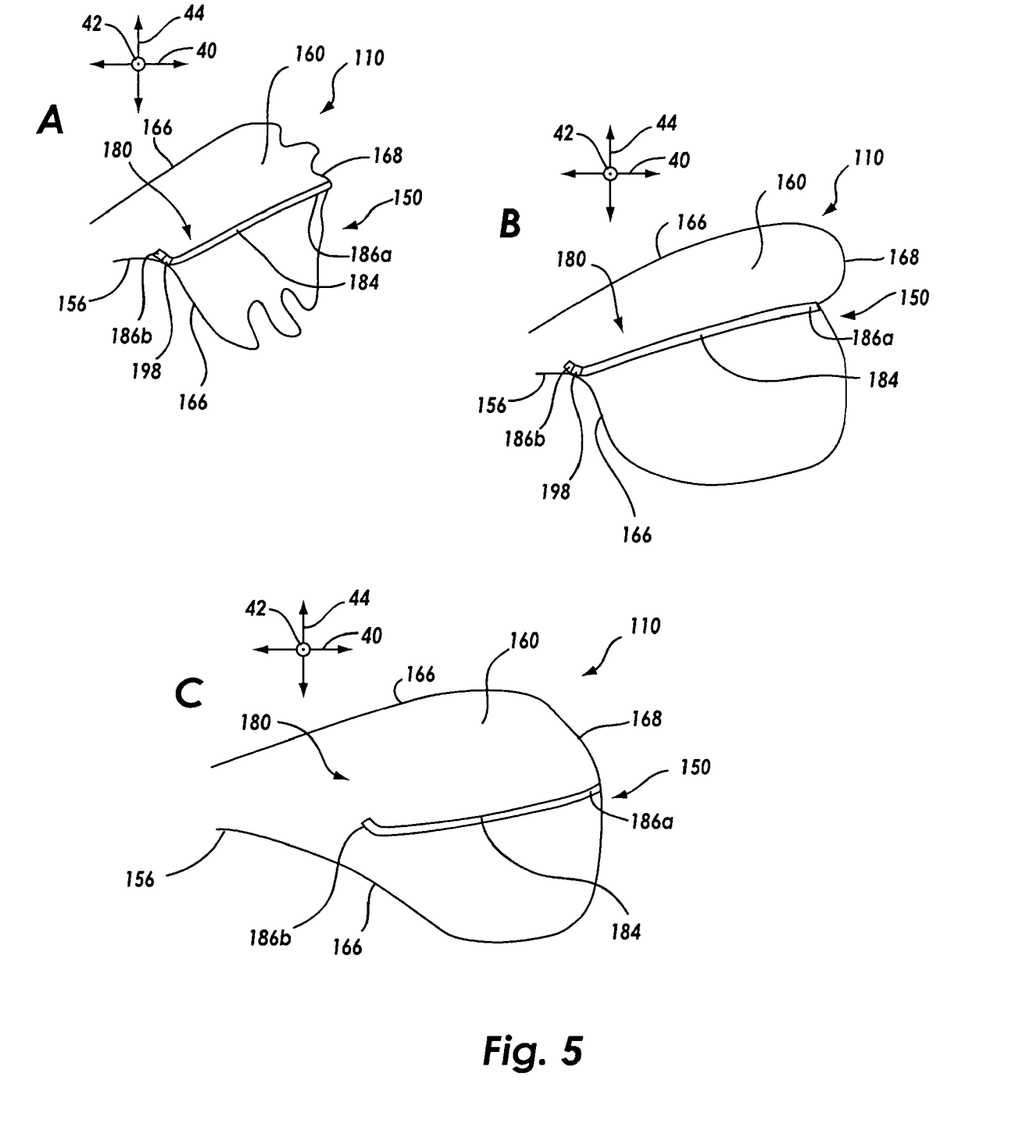
FIG. 5A is an isolated plan view of an airbag cushion incorporating an alternate embodiment of the limiting tether system of the invention with the airbag cushion initially inflated in a longitudinal direction.
FIG. 5B is an isolated plan view of the airbag cushion of FIG. 5A with the airbag cushion more fully expanded in a transverse direction.
FIG. 5C is an isolated plan view of the airbag cushion of FIG. 5A with the limiting tether released and the airbag cushion fully inflated.

FIG. 3 shows the releasable joint 98 in its released state in which the release trigger 92 may still be attached to one of the tethers, here the reaction tether 88. In alternate embodiments of the invention, the release trigger 92 may simply be an extension of the contact or reaction tethers 84, 88. When the joint 98 is released, the contact panel 68 begins to extend in the longitudinal direction 40 to more closely abut the vehicle occupant 18. Thus, when fully inflated, as illustrated in FIG. 4, the contact panel 68 of the inflatable airbag cushion 50 more closely abuts the vehicle occupant 18. In contrast with many airbag cushions currently known and understood in the art, however, this last expansion bringing the contact panel 68 near the occupant 18 occurs with reduced momentum toward the occupant 18. This reduces the potential for out-of-position injury to the occupant 18 in those instances when the vehicle occupant 18 is not in a predicted position when the airbag assembly 10 is initiated.

Referring next to FIG. 5A, an isolated cross-sectional plan view of an airbag assembly 110 having an airbag cushion 150 incorporating an alternate deployment restraint system 180 of the invention is shown. The cushion 150 of FIG. 5A is illustrated to be inflated to the initial longitudinal limit of the restraint system 180. In this embodiment, the deployment restraint system 180 includes a single expansion tether 184 extending from the contact panel 168 of the cushion 150 to the reaction panel 166 of the cushion 150. In this embodiment, the expansion tether 184 is joined to one of the panels 166, 168 of the airbag cushion 150 with a releasable joint 198. In FIG. 5A, the first end 186a of the tether 184 is fixedly linked to the contact panel 168 in the main body 160 of the cushion 150, while the second end 186b of the tether 184 is incorporated into the releasable joint 198 with the reaction panel 166 of the cushion 150. As illustrated, this joint 198 is made near the throat 156 of the cushion 150.

When the airbag cushion 150 is initially deployed, it first expands largely in a substantially longitudinal direction 40 until it reaches the length of the expansion tether 184. When the length of the expansion tether 184 is reached, the airbag cushion 150 is forced to expand radially in a transverse direction 44, upwardly and downwardly. This secondary transverse expansion of the cushion 150 begins to draw the reaction panel 155 of the cushion 150 taut.

Referring next to FIG. 5B, the airbag assembly 110 of FIG. 5A is shown with the inflatable airbag cushion 150 in an intermediate inflation state in which the expansion tether 184 is at its full length, and in which the cushion 150 is inflated fully in a transverse direction. In this state, the panel of the cushion 150 linked to the expansion tether 184 (here the reaction panel 166) acts as a release trigger for the expansion tether 184 by peeling away from the tether 184, thus releasing the releasable joint. As illustrated in FIG. 5B, the joint 198 has begun to release. The peeling away of the reaction panel 166 of the cushion 150 is caused by the expansion of the cushion 150 which draws the reaction panel 166 coupled to the tether 184 downwardly, subjecting the joint 198 to a peeling force. This second transverse direction of expansion occurs at an angle to the initial direction of deployment, in some cases being nearly perpendicular to the initial direction of deployment. As finally illustrated in FIG. 5C, following the release of the joint 198, the expansion tether 184 is freed, thus allowing the contact panel 168 to extend in a longitudinal direction 40 to its full depth.

Figure 6A:
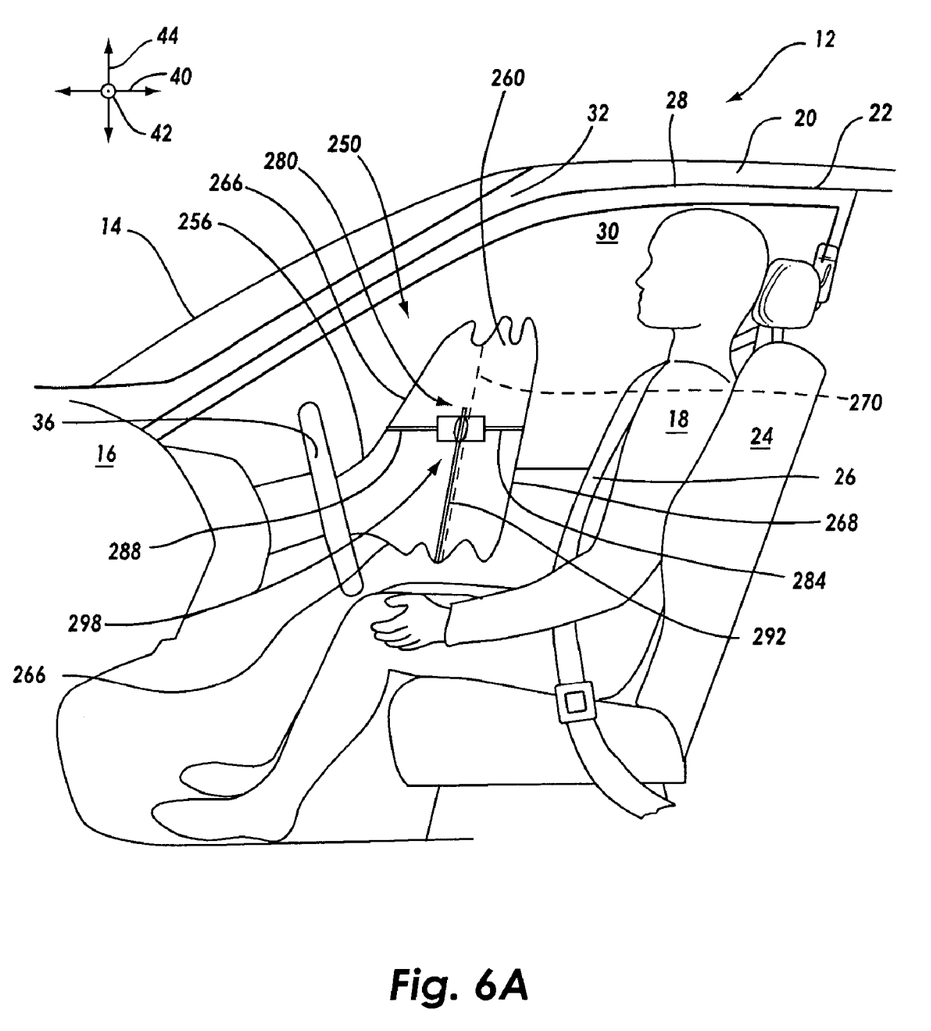
FIG. 6A is an isolated view of a driver's side airbag cushion incorporating a deployment restraint system according to the invention with the airbag cushion initially inflated in a longitudinal direction.

FIG. 6A provides a partial side perspective view of a vehicle 12 incorporating a driver's side airbag cushion 250 having yet another embodiment of a deployment restraint system 280 according to the invention. The vehicle 12 generally includes a windshield 14 and dashboard 16 positioned forward of a vehicle occupant 18 in a longitudinal direction 40. A seat 24 is provided behind the dashboard 16 for the vehicle occupant 18, who may be retained to the seat 24 by a seatbelt 26. The occupant 18 is bounded in a lateral direction 42 by a vehicle door 28, side window 30, and roof 20. The door 28 supports the side window 30 and is bounded in part by a vehicle A-pillar 32 and roof trim 22 of the vehicle 12.

The vehicle 12 of FIG. 6A has an airbag assembly 210 shown to include an airbag cushion 250, and a deployment restraint system 280 housed in the dashboard 16 of the vehicle behind a compartment door 34. The airbag module 210 is configured to place the airbag cushion 250 between the vehicle occupant 18 and the steering wheel 36 during a collision event. The airbag cushion 250 of FIG. 6A is illustrated in a partially-inflated configuration. In this configuration, the airbag cushion 250 is shown to have exited the dashboard 16 and expanded in a longitudinal direction 40 toward the vehicle occupant 18 as far as allowed by the deployment restraint system 280. As in previous figures, the airbag cushion 250 includes a cushion throat 256 and a cushion body 260 made up of a reaction panel 266 and a contact panel 268.

Figure 6B:
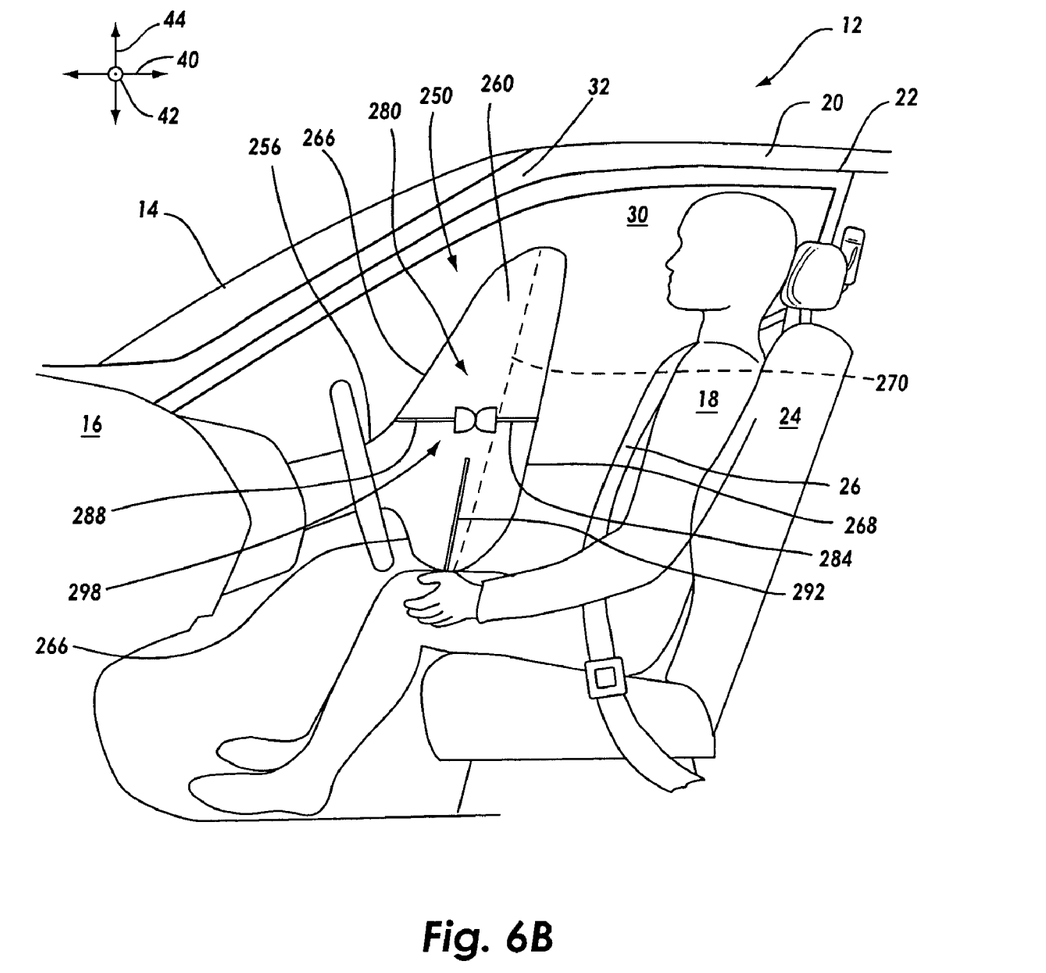
FIG. 6B is an isolated view of the driver's side airbag cushion of FIG. 6A more fully expanded in a transverse direction such that the deployment restraint system has been released.
Figure 6C:
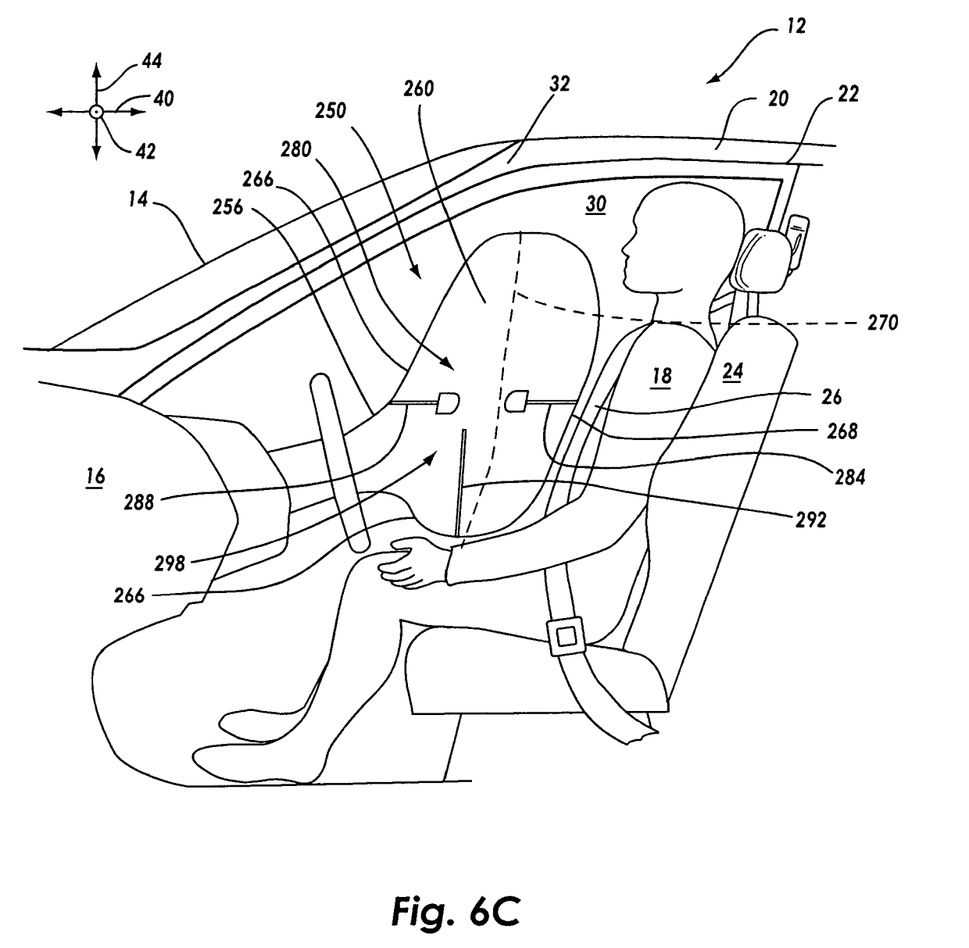
FIG. 6C is an isolated view of the driver's side airbag cushion of FIG. 6A in its fully inflated configuration.

The deployment restraint system 280 is generally disposed in the interior of the airbag cushion 250. In this embodiment of the restraint system 280 of the invention, the cushion 250 is restrained from longitudinal expansion by first and second loop structures 284, 288 extending from the contact and reaction panels 268, 266, respectively, which are held together by an intervening elongated release trigger 292 extending from a seam 270 between the reaction and contact panels 266, 268 of the airbag cushion 250. The release trigger 292 may take many forms within the scope of the invention, with each such structure being configured to pass through the loop structures 284, 288 linking them during storage and early deployment. As illustrated in FIGS. 6B and 6C, as the initial longitudinal deployment illustrated in FIG. 6A is followed by transverse expansion, the trigger 292 is withdrawn from between the loops 284, 288, freeing them and releasing the contact panel 268 of the cushion 250 to expand toward the vehicle occupant 18. The final configuration of the cushion 250 is illustrated in FIG. 6C.

The deployment restraint systems 80, 180, and 280 illustrated in FIGS. 1–4, 5A–5C, and 6A–6C, respectively, are illustrated in conventional, forward-mounted airbag cushions such as dashboard- and steering-wheel-mounted airbag cushions. One of ordinary skill in the art would understand that the deployment restraint systems of the invention are suitable for use in a wide variety of airbag cushions, including, but not limited to, steering wheel-mounted driver's side airbag cushions, dashboard-mounted passenger's side airbag cushions; overhead airbag cushions; inflatable curtain airbag cushions; pillar-mounted airbag cushions; and knee bolsters.

In addition to the above, it is understood that one of ordinary skill in the art would find it obvious to add multiple releasable joints to a deployment restraint system of the invention. This may take several forms. It is first within the scope of the invention to provide a plurality of deployment restraint systems employed in parallel, such as in an inflatable curtain airbag in which it may be desirable to control the deployment of several areas of the cushion.

It is also within the scope of the invention to provide deployment restraint systems having multiple release joints.

Such systems could include, for example, tethers having multiple releasable joints in series. Such systems could provide stepwise deployment of an airbag cushion. More specifically, expansion of the cushion would trigger releases of the release joints in series. This would allow the airbag to expand in stages, with radial expansion triggering the stepwise expansion of the depth of the cushion. In one specific embodiment of this configuration, contact and reaction tethers would be joined with multiple releasable joints, each either linked to a single shared release trigger or to multiple release triggers.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflatable airbag cushion comprising:
    a contact panel adapted to receive a vehicle occupant during a collision event;
    a reaction panel adapted to abut a surface of a vehicle;
    a deployment restraint system attached between the contact and reaction panels, the deployment restraint system being configured to restrict initial expansion of the airbag cushion toward a vehicle occupant in a first direction, the deployment restraint system including a releasable joint having a release trigger attached to a panel of the airbag cushion; and
    wherein expansion of the airbag cushion in a second direction at an angle to the first direction of expansion actuates the release trigger, thus enabling the airbag cushion to expand to a fully-inflated state.

2. The inflatable airbag cushion of claim 1, wherein the deployment restraint system comprises first and second tethers extending from the contact and reaction panels, respectively.

3. The inflatable airbag cushion of claim 2, wherein the releasable joint of the deployment restraint system is formed using a linker selected from the group consisting of an adhesive, a hook-and-loop fastener, releasable stitching, frangible stitching, a heat weld, a friction weld, and a mechanical fastener.

4. The inflatable airbag cushion of claim 3, wherein the release trigger is a third tether extending from the releasable joint and attached to a panel of the airbag cushion.

5. The inflatable airbag cushion of claim 4, wherein the third tether of the release trigger is an extension of either the first or second tether of the deployment restraint system.

6. The inflatable airbag cushion of claim 4, wherein the third tether of the release trigger is attached to the contact and reaction panels at a seam between the contact and reaction panels.

7. The inflatable airbag cushion of claim 2, wherein the releasable joint of the deployment restraint system is formed using two mechanical interlinks joined by an intervening mechanical release trigger.

8. The inflatable airbag cushion of claim 7, wherein the mechanical interlinks comprise loops extending from the contact and reaction panels of the airbag cushion, and wherein the mechanical release trigger comprises an intervening joining rod, wherein expansion of the airbag cushion in a second direction located at an angle to the first direction of expansion actuates the mechanical release trigger by causing withdrawal of the joining rod from the loops of the contact and reaction panels of the airbag cushion.

9. The inflatable airbag cushion of claim 1, wherein the deployment restraint system comprises an expansion tether attached between the contact and reaction panels of the airbag cushion, wherein the expansion tether includes a releasable joint and a release trigger attached to a panel of the airbag cushion.

10. The inflatable airbag cushion of claim 9, wherein the releasable joint is formed between a panel of the airbag cushion and the expansion tether such that inflation of the airbag cushion toward a vehicle occupant in a first direction of expansion extends the expansion tether and inflation of the airbag cushion in a second direction at an angle to the first direction of expansion actuates the release trigger.

11. The inflatable airbag cushion of claim 10, wherein the releasable joint of the deployment restraint system is formed using a linker selected from the group consisting of an adhesive, a hook-and-loop fastener, releasable stitching, frangible stitching, a heat weld, a friction weld, and a mechanical fastener.

12. The inflatable airbag cushion of claim 10, wherein the release trigger of the releasable joint is the panel of the airbag incorporated into the releasable joint of the deployment restraint system.

13. The inflatable airbag cushion of claim 1, wherein the airbag cushion is a driver's side airbag cushion.

14. The inflatable airbag cushion of claim 1, wherein the second direction of expansion is at an angle substantially perpendicular to the first direction of expansion.

15. The inflatable airbag cushion of claim 14, wherein the second direction of expansion is downward relative to the first direction of expansion.

16. The inflatable airbag cushion of claim 14, wherein the second direction of expansion is upward relative to the first direction of expansion.

17. An inflatable airbag cushion comprising:
    a contact panel positioned to receive a vehicle occupant when deployed;
    a reaction panel positioned to abut a vehicular surface when deployed;
    a reaction tether having a first end extending from the reaction panel of the airbag cushion and a second end attached to a panel of the airbag cushion;
    a limiting tether having a first end extending from the contact panel of the airbag cushion and a second end linked to an intermediate portion of the reaction tether with a releasable joint,
    wherein the inflated depth of the inflatable airbag cushion is initially limited during inflation by the reaction and limiting tethers until the inflatable airbag cushion has substantially reached a predetermined inflated breadth.

18. The inflatable airbag cushion of claim 17, wherein the releasable joint linking the reaction tether and the limiting tether is formed using a joining method selected from the group consisting of: joining using an adhesive, joining using a hook-and-loop fastener, joining using releasable stitching, joining using frangible stitching, joining using a heat weld, joining using a friction weld, and joining using a mechanical fastener.

19. The inflatable airbag cushion of claim 17, wherein the airbag cushion is a dashboard-mounted passenger's side airbag cushion.

20. An inflatable airbag cushion comprising:
    a contact panel positioned to receive a vehicle occupant when deployed;

a reaction panel positioned to abut a vehicular surface when deployed;

a reaction tether having a first end extending from the reaction panel of the airbag cushion and a second end attached to a panel of the airbag cushion;

a limiting tether having a first end extending from the contact panel of the airbag cushion and a second end linked to an intermediate portion of the reaction tether with a releasable joint, wherein the inflated depth of the inflatable airbag cushion is initially limited during inflation by the limiting tether until the inflatable airbag cushion has substantially reached a predetermined inflated breadth.

21. The inflatable airbag cushion of claim 20, wherein the releasable joint linking the limiting tether and the reaction panel is formed using a joining method selected from the group consisting of: joining using an adhesive, joining using a hook-and-loop fastener, joining using releasable stitching, joining using frangible stitching, joining using a heat weld, joining using a friction weld, and joining using a mechanical fastener.

22. The inflatable airbag cushion of claim 20, wherein the airbag cushion is a driver's side airbag cushion.

\* \* \* \* \*